April 21, 1953     E. B. NORWOOD     2,635,429
ROTARY FLUID COUPLING CONSTRUCTION
Filed Aug. 2, 1951
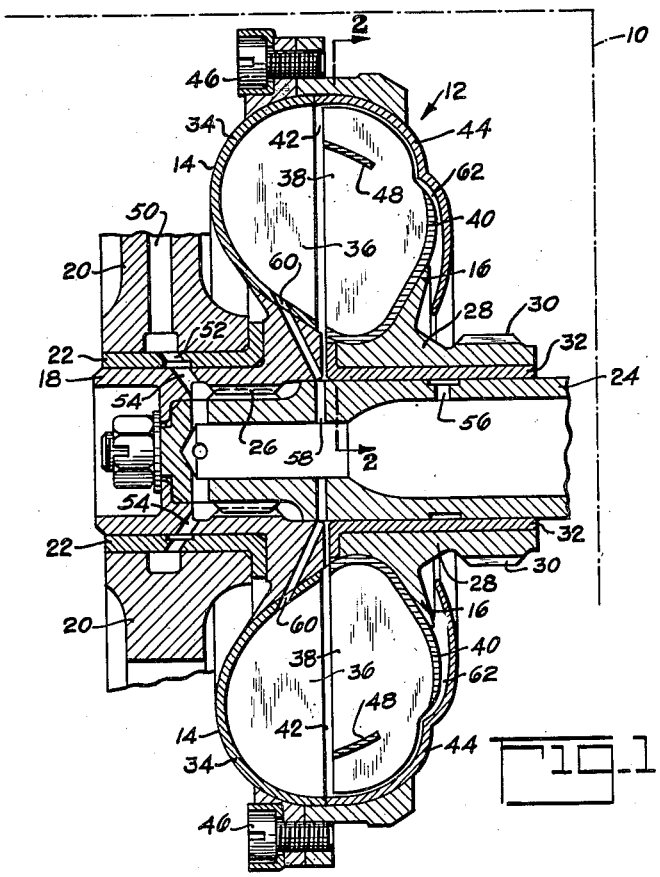
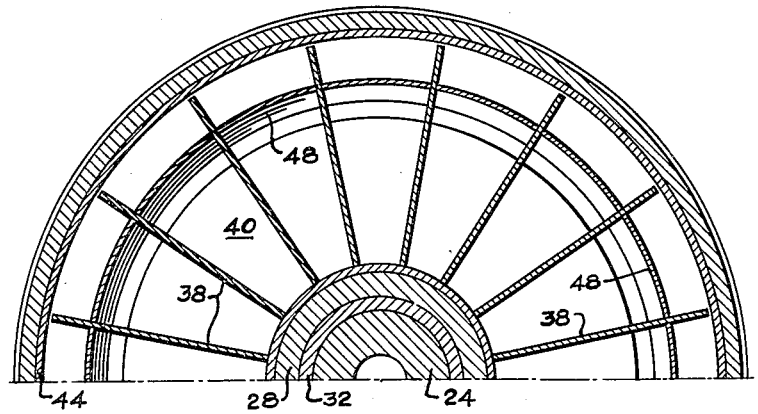
INVENTOR.
EARL B. NORWOOD.
BY
ATTORNEY Patented Apr. 21, 1953

2,635,429

UNITED STATES PATENT OFFICE 2,635,429

ROTARY FLUID COUPLING CONSTRUCTION

Earl B. Norwood, Fairlawn, N. J., assignor to Curtiss-Wright Corporation, a corporation of Delaware Application August 2, 1951, Serial No. 239,883

3 Claims. (Cl. 60—54)

This invention relates to hydraulic couplings and is particularly directed to the provision of means for preventing the accumulation and formation of sludge deposits in hydraulic couplings.

Hydraulic couplings which are used in connection with internal combustion engines may use the engine lubricating oil as the coupling liquid. In such a case sludge deposits tend to build up at the periphery of the coupling as a result of the centrifugal force acting on the sludge in the coupling oil. This is particularly true if there is a continual circulation of oil through the coupling. Where a hydraulic coupling is disposed within the crankcase or housing of an internal combustion engine, for example as illustrated in copending application Serial No. 760,385 filed July 11, 1947, now Patent No. 2,607,189, it is desirable that there be a continual circulation of oil through the coupling in order to remove the heat which is generated as a result of the inherent slip of the coupling. As a result, a large quantity of engine oil is repeatedly circulated through the coupling whereby sludge deposits may build up to such an extent at the coupling periphery so as to lock the driving and driven elements of the coupling together.

A conventional hydraulic coupling consists of a vaned impeller or driving member and a complementary runner or driven member. Each of said members has a shell from which their respective circumferentially-spaced vanes extend toward the vanes of the other member and said shells form a toroidal space therebetween which is the chamber for the working liquid of the coupling. Because of the inherent slip of a hydraulic coupling some clearance is provided between the peripheral portions of the shells of the driving and driven members of the coupling. In a hydraulic coupling of the constant fill type, a cover member is formed rigid with the shell of one of the coupling members, said cover member surrounding the other coupling member and extending radially inwardly from the periphery to the hub of said other coupling member. If coupling liquid is continually circulated through the working chamber of such a coupling, said liquid flows out through the clearance between the two shells of the coupling at the periphery of the coupling working chamber and thence through the coupling outlet passage formed by the annular space between said cover member and the adjacent shell. Where the engine lubricating oil is used as the coupling liquid in a coupling of said conventional construction, sludge deposits tend to build up between said cover member and shell adjacent to the outer periphery of the coupling, which deposits may become sufficient to lock said cover member and shell together.

An object of the present invention comprises the provision of a novel and simple hydraulic coupling construction which minimizes said tendency of sludge to deposit between said cover member and the adjacent shell. In accordance with the invention, the coupling shell which is surrounded by the cover member terminates a substantial radial distance short or inwardly of the periphery of said coupling whereby the vanes of said shell project radially outwardly beyond the periphery of said shell. The coupling cover member is formed to enclose, with small clearance, said projecting vane portions and in addition said cover member extends radially inwardly around said short shell. With this arrangement, the inner surface of the cover member adjacent to the periphery of coupling is exposed to the vortex flow of the coupling liquid within the coupling working chamber whereby said vortex flow scours said exposed surface of the coupling cover member to prevent the accumulation of sludge deposits thereon. Furthermore with this arrangement, the entrance from the coupling working chamber to the coupling outlet passage, formed by the annular space between the coupling cover member and the adjacent shell, is now a substantial distance radially inwardly of the periphery of the coupling thereby reducing the tendency for sludge deposits to build up between said cover member and shell.

Other objects of the invention will become apparent upon reading the annexed detailed description in connection with the drawing in which:

Fig. 1 is a schematic view illustrating, in axial section, a hydraulic coupling construction embodying the invention; and Fig. 2 is a sectional view taken along line 2—2 of Fig. 1.

Referring now to the drawing, reference numeral 10 designates a schematic representation of a housing or crankcase of an internal combustion engine within which a hydraulic coupling 12 is disposed. By way of example, the hydraulic coupling 12 and engine 10 may comprise the combination illustrated in the aforementioned copending application.

The hydraulic coupling 12 includes a driving coupling member 14 and a driven coupling member 16. The driving coupling member 14 has a hub 18 which is journaled in a fixed bearing member 20 by a bushing 22. A hollow driving shaft 24 is splined to the hub of the driving coupling member, as indicated at 26. The driven coupling member 16 has a hub 28 and a gear or a spline formation 30 is formed integral with said hub for transmitting torque therefrom. A bushing 32 is disposed between the drive shaft 24 and the driven coupling member hub 28 whereby the driven coupling member 16 is journaled on said shaft 24.

The driving coupling member 14 comprises a shell 34 from which a plurality of circumferentially-spaced vanes 36 extend toward corresponding vanes 38 of a shell 40 of the driven coupling member 16. The vanes 36 and 38 are secured to their respective shells 34 and 40 as by brazing. The toroidal-shaped chamber 42 between the shells 34 and 40 constitutes the chamber for the working liquid of the coupling. The shell 34 extends to the outer periphery of the coupling working chamber 42 but, unlike a conventional hydraulic coupling, the shell 40 terminates a substantial radial distance short of the outer periphery of said chamber. The vanes 38, however, of the driven coupling member 16 project radially outwardly beyond the outer periphery of the shell 40 to the outer periphery of the coupling working chamber 42. The coupling 12 also has a cover member 44 which is secured to the driving coupling members shell 34, as by screws 46. The cover member 44 forms a continuation of the shell 34 and overlies the projecting portion of the vanes 38 in close clearance relation and extends around the driven coupling member shell 40 substantially to the hub of said driven coupling member. The coupling also includes members 48 which extend between and are secured, as by brazing, to the portions of the vanes 38 projecting beyond the outer periphery of the shell 40 to restrain vibration of said projecting vane portions.

As illustrated and described, the coupling cover member 44 is secured to the driving coupling member 14 and the shell 40 of the driven coupling member 16 terminates short of the outer periphery of the coupling. Obviously however this structure could be reversed in which case the coupling cover member would be secured to the driven coupling member and the shell of the driving coupling member would terminate short of the outer periphery of the coupling.

Engine lubricating oil is supplied through a passage 50 in the fixed bearing support member 20 for lubrication of the bearing bushing 22. From the passage 50, said oil also also flows through holes 52 in the bushing 22 and thence through holes 54 in the driving coupling member hub 18 into the hollow shaft 24. From within the shaft 24 lubricating oil is also supplied through holes 56 in the shaft 24 to the bearing bushing 32 for lubrication of said bushing. In addition engine lubricating oil is supplied from the hollow shaft 24 through passages 58 and thence through passages 60 and through the annular space between the adjacent hubs 18 and 28 of the coupling members into the coupling working chamber 42. The size of the passages 58 is made to determine the rate of oil flow into and through the coupling working chamber 42.

With this coupling construction, during coupling operation oil is continually supplied to the coupling working chamber 42 from the hollow shaft 24, said oil filling said chamber and continually overflowing from said chamber through the outlet passage formed by the annular space 62 between the shell 40 and the cover member 44. This continual flow of oil through the coupling working chamber 42 helps to remove the heat generated during coupling operation as a result of the inherent slip between the driving and driven members of the coupling.

If the coupling 12 had the conventional construction, the shell 40 would extend to the periphery of the coupling working chamber in which case the oil outlet passage from the coupling working chamber would extend from the periphery of the coupling inwardly to a point adjacent to the hub of said coupling. It has been found that with such prior construction, the centrifugal force acting on the oil at the coupling periphery, at high rotative speeds of the coupling, is sufficient to cause sludge deposits to accumulate and cake in said outlet passage at its periphery thereby closing said outlet passage and locking the driving and driven coupling members together. Within the coupling working chamber, the vortex flow of the coupling liquid is sufficient to prevent any accumulation of sludge deposits.

With the aforedescribed construction of the present invention, the shell 40 terminates a substantial radial distance short of the periphery of the coupling whereby the portion of the cover member 44 radially outwardly from said shell 40 is exposed to the vortex flow of the liquid within the coupling working chamber 42. Accordingly said vortex flow of the liquid within the coupling working chamber scours said exposed surface of the cover member 44 to prevent the accumulation of sludge deposits thereon. In addition since the cover member 44 closely surrounds the portion of the vanes 38 projecting radially outwardly beyond the shell 40, the relative motion between said vane portions and the cover member 44, during coupling operation, further prevents the accumulation of any sludge deposits on said cover member at the coupling periphery. Furthermore the radially outer end of the coupling outlet passage 62 is a substantial distance radially inwardly of the coupling periphery. Accordingly, for a given coupling speed, the maximum centrifugal force acting on the oil in the outlet passage 62 is substantially decreased compared to the centrifugal force which would be acting on the oil at the entrance to the coupling outlet passage of said passage extended to the periphery of the coupling as in the prior art. As a result of this reduction in the centrifugal force acting on the oil in this coupling outlet passage, the flow through said passage readily prevents the accumulation of sludge deposits therein.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A hydraulic coupling having a toroidal-shaped working chamber for the coupling liquid; said coupling comprising a driving coupling member; a driven coupling member; each of said coupling members having a plurality of circumferentially-spaced vanes disposed within said chamber; one of said coupling members having a shell portion rotationally rigid therewith and bounding a portion of said chamber, said shell extending radially outwardly from the hub of said one coupling member and terminating a substantial radial distance short of the radially outer periphery of said chamber and the vanes of said one coupling member having portions extending radially outwardly beyond said one coupling member shell toward said chamber periphery; the other of said coupling members having a cover member rotationally rigid therewith overlying said projection vane portions and bounding at least a portion of said chamber radially outwardly of said shell, said cover member extending radially inwardly around said shell so as to overlap at least the radially outer portion of said shell, the adjacent surfaces of the overlapping portions of said shell and cover member being spaced apart and constituting the walls of an outlet passageway for the coupling liquid; and a coupling liquid inlet passageway through which liquid is continuously supplied to the coupling working chamber for flow through said chamber and thence through said outlet passageway.

2. A hydraulic coupling having a toroidal-shaped working chamber for the coupling liquid; said coupling comprising a driving coupling member; a driven coupling member; each of said coupling members having a shell bounding a portion of the working chamber and having a plurality of circumferentially-spaced vanes extending from its shell toward the vanes of the other shell, the shell of one of said coupling members extending radially outwardly from the hub of its coupling member and terminating a substantial radial distance short of the outer periphery of said working chamber and the vanes of said one coupling member having portions projecting radially outwardly beyond said one coupling member shell toward the outer periphery of said chamber; the shell of the other coupling member extending radially outwardly from the hub of its coupling member to the outer periphery of said working chamber and having a portion extending radially inwardly around said one coupling member to a point adjacent the hub of said one coupling member so as to overlie said projecting portions of the vanes of said one coupling member and so as to overlap the shell of said one coupling member, the adjacent surfaces of the overlapping portions of said shells being spaced apart and constituting the walls of an outlet passageway for the coupling liquid; and a coupling liquid inlet passageway through which liquid is continuously supplied to the coupling working chamber for flow through said chamber and thence through said outlet passageway.

3. A hydraulic coupling as recited in claim 2 and including means disposed between said projecting vane portions of said one coupling member for restraining vibration of said portions.

EARL B. NORWOOD.

References Cited in the file of this patent

UNITED STATES PATENTS

| Number | Name | Date |
| --- | --- | --- |
| 1,910,696 | Kiep | May 23, 1933 |
| 2,186,748 | Berger | Jan. 9, 1940 |
| 2,436,412 | Zeidler | Feb. 24, 1948 |